Dec. 17, 1935.  E. C. EBERTS ET AL  2,024,344

FRUIT AND VEGETABLE WASHING MACHINE

Original Filed June 22, 1931   2 Sheets-Sheet 1

INVENTOR
Edward C. Eberts.
Edward D. Eberts
ATTORNEY

Dec. 17, 1935.　　　E. C. EBERTS ET AL　　　2,024,344

FRUIT AND VEGETABLE WASHING MACHINE

Original Filed June 22, 1931　2 Sheets-Sheet 2

INVENTOR
Edward C. Eberts
Oswald Eberts
BY
J. Graham
ATTORNEY

Patented Dec. 17, 1935

2,024,344

UNITED STATES PATENT OFFICE 2,024,344

FRUIT AND VEGETABLE WASHING MACHINE

Edward C. Eberts and Edward D. Eberts, Greenwood, Ind.

Application June 22, 1931, Serial No. 546,118
Renewed March 6, 1935

6 Claims. (Cl. 209—173)

This invention relates to a machine for washing vegetables or the like by separating therefrom certain débris that can be made to float away through a column of rising liquid, and is particularly adapted to the washing of peas and the like to remove pieces of pods, leaves and other undesirable matter accumulated during the harvesting and shelling of the product.

The general arrangement embodying the invention comprises a circular tank for carrying a supply of liquid with means for forcing the liquid into the tank near the bottom thereof and somewhat tangent thereto to cause a more or less whirling action which will have the effect of conveying settling material out of the tank through a suitably arranged inclined conduit.

Inside the tank near the top are arranged a series of tubes extending around near the periphery of the tank and extending down into the tubes for a short distance I use either additional smaller tubes or sheets of screen material as will be more fully pointed out, for directing the material fed to the machine, down into the solution where the separation takes place, the water or other fluid entering the bottom of the tank rising up into the tubes and overflowing into suitable channels for carrying away the débris that floats out with the flowing liquid.

Arranged in the top of the tank is a centrally disposed hopper into which the material to be washed is dumped and directly below the hopper is a revolving distributor onto which the material falls and is thrown outward by centrifugal force and evenly deposited over the open top ends of the washing tubes. If inner tubes are used the material passes down these into the body of the solution and that part of the material that floats easily is carried upward by the flow of the current while the heavier particles will settle against the current and be carried out the bottom of the tank up the inclined conduit mentioned, the floating material passing up around the central tubes and carried over the tops of the separating tubes into an annular conduit located around the outside of the upper part of the main tank, from where it flows to screening means which separates the débris from the liquid passing the débris away as waste material and passing the liquid back to a main supply tank for reuse. If a sheet of screen material is used in the tops of the separating tubes instead of the smaller tubes, it is adjusted so that its bottom edge is immersed in the solution a few inches below the surface of the liquid, so that the incoming material will have to pass under this immersed edge in order to float out of the separating tubes. The apparatus is also adapted to the separation of hard from soft peas in which case a brine solution is used and the manner of separation is substantially like that just described for separating the débris.

It is an object of the invention to provide a machine for washing vegetables by utilizing an upward flow of solution through a series of tubes and causing a separation of material to take place through the difference in buoyancy of the mixed material and the upward flow of the liquid which carries the lighter material out over the tops of the tubes and the heavier material sinks and is removed from the bottom of the tubes.

It is also an object of the invention to provide a machine for washing vegetables and the like wherein a circular tank is used and the series of separating tubes are arranged concentrically therein with means for forcing liquid under pressure into the bottom of the tank and impart a whirling motion thereto to remove the material that sinks in the liquid.

It is also an object of the invention to provide a machine for washing vegetables and the like wherein a series of separating tubes are employed and wherein the tubes are arranged in pairs with one tube extending down into the other, the material being deposited in the inner tube and caused to be immersed in the solution wherein the lighter will float upward in the space between the tubes.

It is also an object of the invention to provide a feed device for a vegetable washing machine wherein the material is delivered to a rotary device for even and uniform distribution to a series of separating tubes.

It is also an object of the invention to provide a machine for washing vegetables and separating débris therefrom wherein an adjustable inclined conduit is provided for carrying away a part of the separated material and to also control the level of separating material or solution in the machine.

It is also an object of the invention to provide a machine for washing vegetables and separating débris therefrom wherein a series of separating tubes are arranged concentrically within a tank with open tops and to position screen material in the said open tops to cause an immersion of material in the solution where separation takes place and a part of the material passes under the edge of the screen and floats out over the tops of the tubes.

With such objects in view as well as other advantages that may be inherent in the invention, consisting in the parts and combinations hereinafter set forth and claimed, it is understood that the several necessary elements and combinations constituting the same may be varied in their proportions, placement and general arrangement without departing from the scope and nature of the invention, and to make the invention clearly understood there are shown, somewhat diagrammatically, in the accompanying drawings means and mechanism for placing the same in concrete form without limiting the improvements to the particular construction shown to illustrate the invention.

In the drawings Fig. 1 is a vertical elevation of an apparatus embodying the invention.

Fig. 5 is a detail view showing the arrangement of the screen device entering the tops of the separating tubes when the screen is used instead of a smaller central tube.

Figure 1:
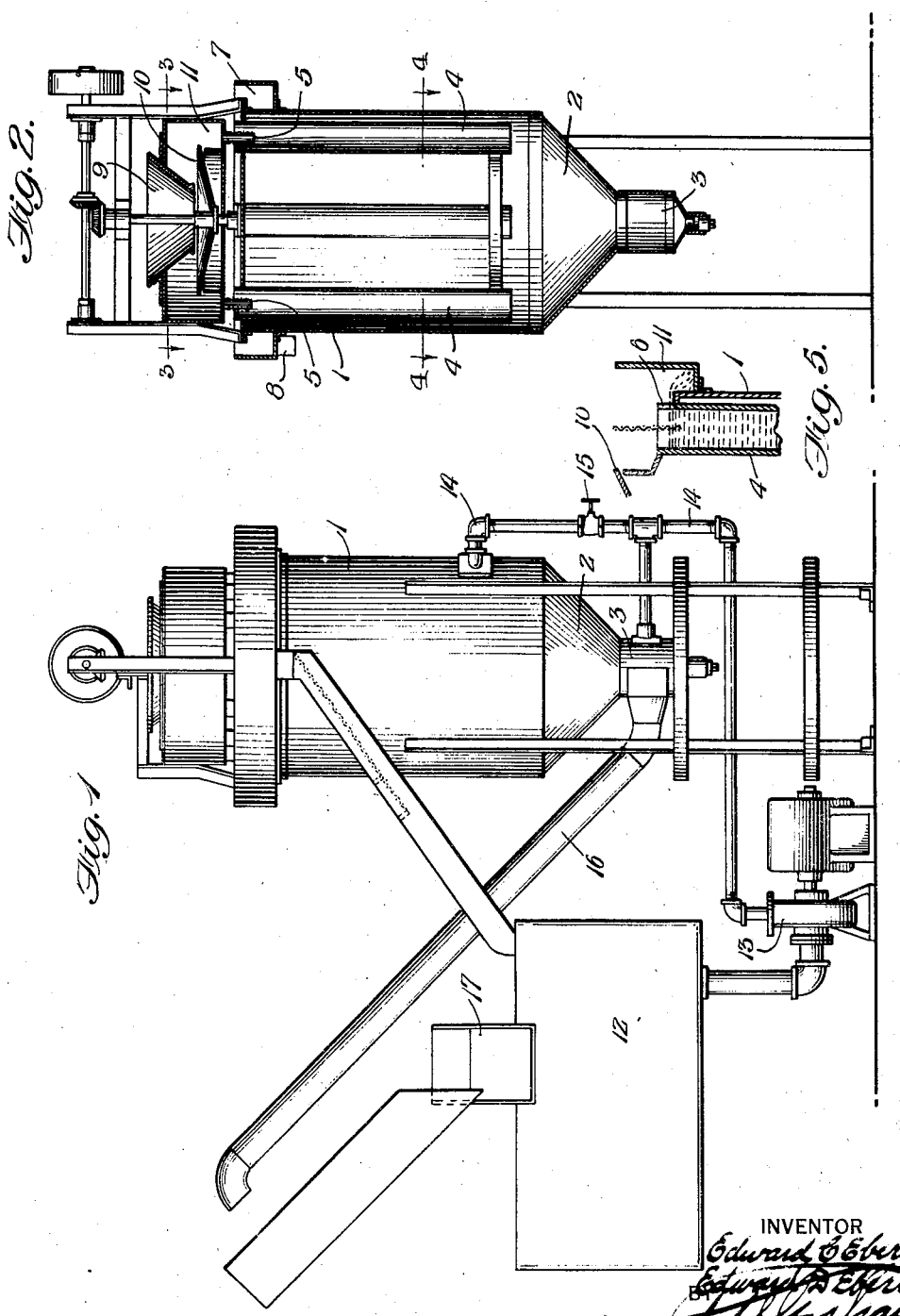
Figure 2:
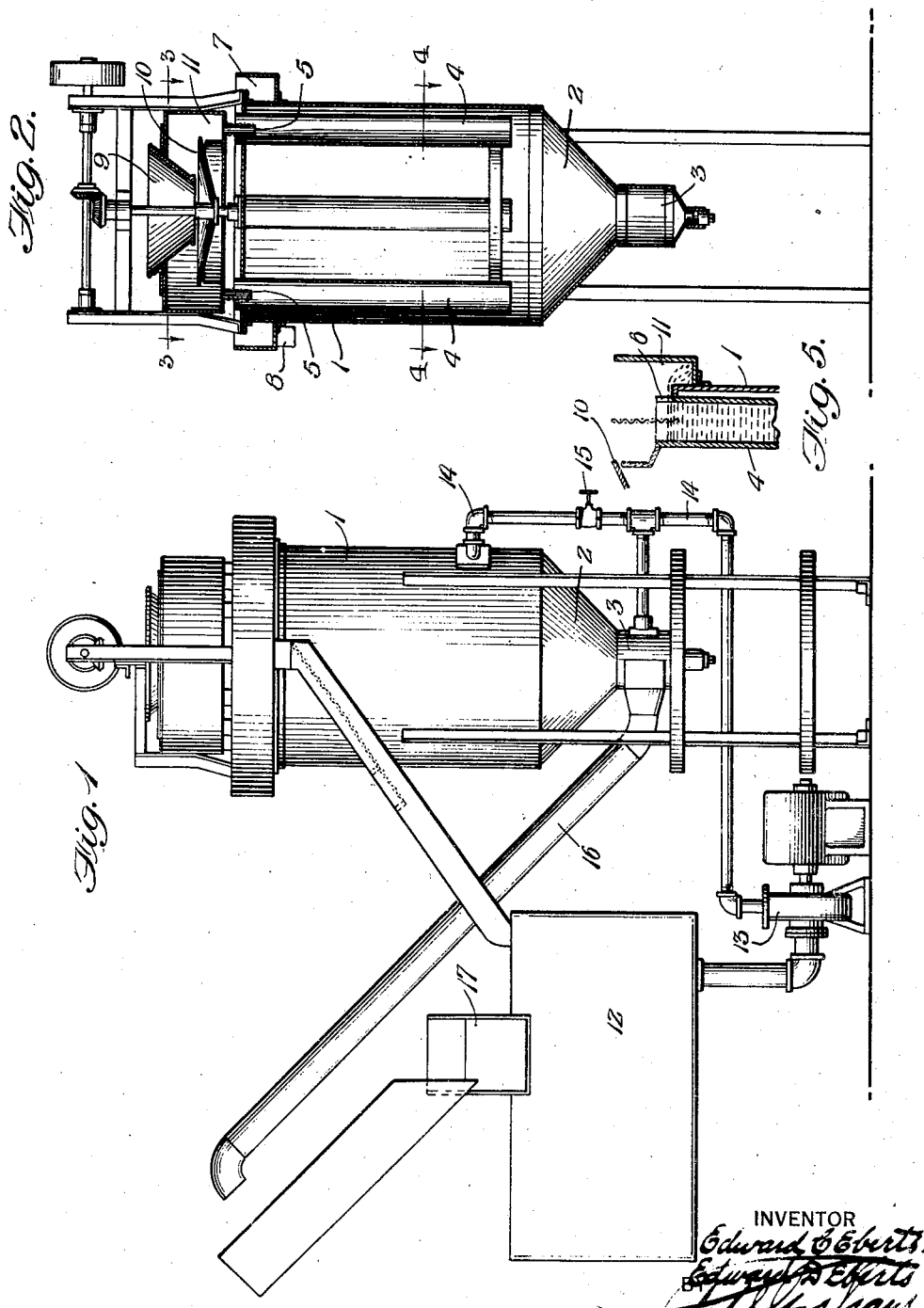
Fig. 2 is a sectional elevation of Fig. 1 showing the interior construction.
Figure 3:
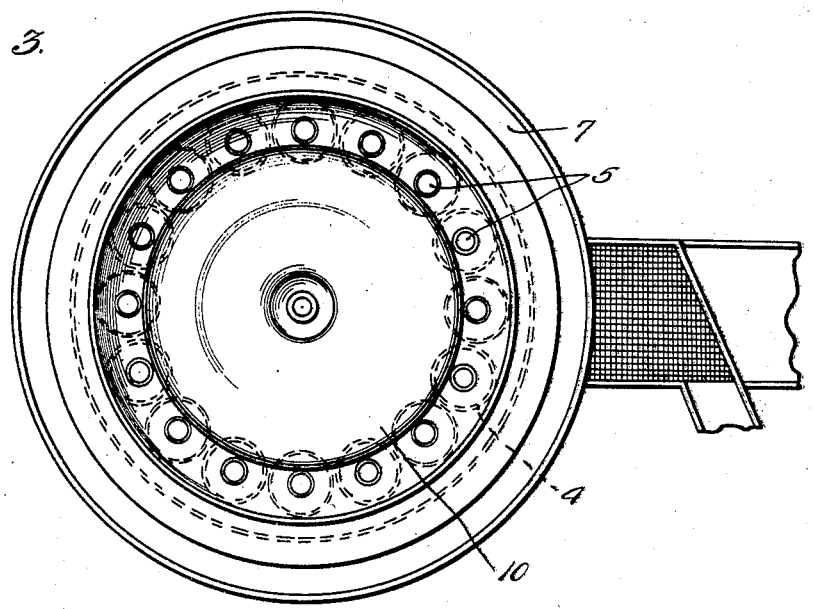
Fig. 3 is a cross section of the top of the apparatus taken on substantially the line 3—3 of Fig. 2.
Figure 4:
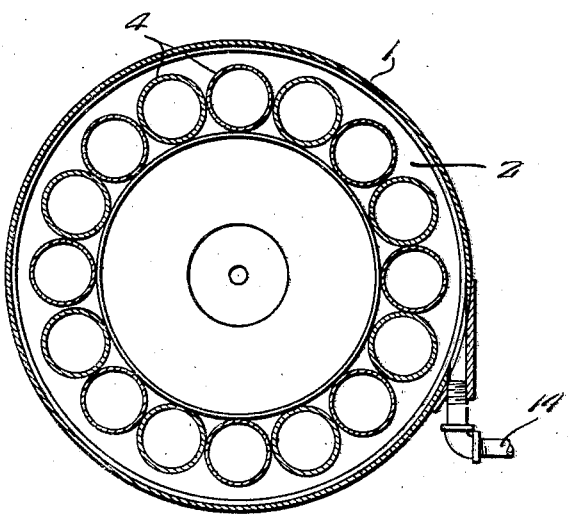
Fig. 4 is a cross section lower down on the apparatus taken on substantially the line 4—4 of Fig. 2.

Before passing to a description of the machine as represented by the accompanying drawings applicant wishes to point out that the drawings are more or less diagrammatic in character; are not necessarily made to scale; they may not represent the best engineering practices in connection with the construction of this type of apparatus, and the proportions of the relative parts may be more or less exaggerated in size or shape to better illustrate the application on the invention to an operative machine.

The separation tank 1, is mounted on suitable standards to hold it above the floor and is provided with a conical bottom 2 with a lower cylindrical extension 3. Inside the tank are arranged the separating tubes 4, with the feed tubes 5 which may be of imperforate material or of screen material as shown, or instead of the tubes a sheet of screen material may be used as is illustrated in Fig. 5. The separating tubes are arranged in circular formation and overflow into a surrounding gutter 7 into which the débris is carried by the overflow and is washed or floated out of suitable openings 8, from which it may be deposited in suitable receptacles or onto a conveyor neither of which are shown.

Material to be washed or otherwise treated is dumped by any suitable means into the hopper 9 from which it falls onto the revolving distributor disk 10 and is thereby thrown outward by centrifugal force into a gutter 11 to which the feed tubes 5 are connected and through which it passes into the solution in the tubes and settles, passing from the lower ends of the inner tubes and spreads outward into the body of solution where the upward flow will tend to carry the light material that would naturally float, upward through the outer tubes and float it over the edges thereof into the débris gutter 7, while the material that would naturally sink moves down through the solution toward the bottom of the tank and is caught by the stream of solution there and removed. The rotary distributor disk is driven by the gearing and pulley as shown from any suitable source of power supply not shown.

A tank of solution supply 12 connects with a rotary pump 13 which forces liquid to the bottom 3 of the separating tank 1, and also by a pipe 14 liquid is supplied to the separating tank just above the conical bottom which flow is controlled by the valve 15 so that any desired quantity of liquid may be projected into the tank by this means, the two solution supplies to the bottom of the tank producing a whirling motion which has the effect of forcing the sinking material out of the tank through the inclined conduit 16 from which it is discharged onto a separating screen which drains the liquid back into the tank 12 and delivers the washed material into a chute 17 for further disposal. The whirling movement also prevents the sinking material from choking the entrance from the tank into the flowing stream through the discharge conduit 16 flowing across the bottom of the tank. The material floating over the tops of the separating tubes into the gutter 7 may also be treated in the same manner as the sinking material by delivering it to a screen which will separate the débris and pass the solution back to the tank 12.

If the machine is used for gravity separation of peas or like vegetables the operation is substantially the same as for washing débris from the same vegetables except that a suitable brine solution is used wherein the peas of lighter density will float to the top and those of heavier density will sink to the bottom, in each instance the flow of the solution acts to convey the separated material away from the area of separation.

The water supplied by the pipe 14 serves to raise the level of liquid at the tops of the separating tubes 4 so that there will be an overflow of sufficient depth to carry away the larger pieces of débris and floating material. It also serves to produce the whirling movement mentioned and a slight downward flow to the body of fluid in the lower part of the tank to help to carry away the sinking material and prevent choking the bottom opening to the tank.

Having thus described my invention what I claim as new and desire to secure by Letters Patent is:

1. An apparatus for washing vegetables or the like comprising a tank for confining a body of washing fluid, two separate means for supplying washing fluid to said tank, means within said tank for dividing said flowing fluid into a series of isolated flowing columns of fluid, a separate overflow for each column of fluid and means for receiving the aggregate of said overflows and carrying them away, hopper means for receiving a mixed mass of vegetables and débris, rotary means below said hopper for receiving said mixed mass and giving it radial and circumferential movement for distributing it simultaneously to all of said vertical columns of flowing fluid with means in each column for causing the mixed material to pass under the surface of the fluid, the floating material of the mass following the overflow of said several fluid columns and the heavier material settling through said columns of fluid, one of said fluid supply means being adjacent the bottoms of said isolated columns for receiving all of said sinking material and carrying it away therefrom, the other of said supply means adding additional fluid to said body of fluid to raise the overflow level from said isolated columns.

2. An apparatus for washing vegetables or the like comprising a tank for confining a body of washing fluid, pump means for producing an upward flow of solution in said tank, a series of tubular members within said tank for dividing said flowing fluid into a series of isolated columns, a separate overflow for each of said columns of fluid and means adjacent said overflows to receive the aggregate of overflows and carry them away, hopper means for receiving a mixed mass of débris and vegetables, rotary disk means below said hopper for receiving said mixed mass of material, means for rotating said disk means to impart radial and circumferential movement to the material received thereby for distributing it simultaneously to all of said isolated columns of fluid with means associated with each column of fluid to cause the mixed mass of material deposited therein to pass under the surface thereof, the floating material of said mass following the overflow of the said several columns and the heavier material sinking through said flowing columns with means adjacent the bottoms of said columns for accumulating said sinking material and a delivery conduit through which said material is carried away from said accumulating means.

3. An apparatus for washing vegetables or the like and removing débris therefrom comprising a tank for confining a body of washing fluid, pump means for circulating said fluid through said tank, tubular members arranged circumferentially around said tank and having open tops and bottoms for dividing said flowing fluid into a series of vertical isolated columns, a separate overflow for each tube member and a conduit for receiving the aggregate overflow from all of said tube members and conveying it away therefrom, hopper means located above said tube members and a revolving disk member between said hopper and the tops of said tube members, the said hopper receiving a mixed mass of material to be cleaned and depositing the mass onto said revolving disk member, means for rotating said disk member to impart both radial and circumferential movement to said mass of material and discharge it from the periphery thereof to distribute it simultaneously to all of said open top tube members, means associated with each tube member to cause said material as deposited to pass down under the surface of the flowing fluid, the floating part of said mixed mass of material following the overflow of said flowing fluid and passing into the conduit receiving said overflows, the heavier material of said mixed mass settling down through the said vertical columns, means adjacent the bottoms of said columns to accumulate said settling material with conduit means connected with said accumulating means for carrying said settling material away therefrom.

4. An apparatus for washing and cleaning vegetables or the like comprising a vertically disposed cylindrical tank having a conical bottom, a series of vertically disposed tube members arranged circumferentially around the inside of said tank and in fixed relation thereto, said tube members acting as means to isolate vertically flowing columns of washing fluid, means for forcing washing fluid into said tank and through said tube members to a series of overflows, conduit means for receiving the aggregate overflow from said tube members, a hopper fixed relative to said tank, a rotatable distributing member having a substantially flat upper surface and positioned under said hopper to receive mixed material therefrom, means for rotating said distributing member to impart centrifugal force to material deposited thereon and thereby simultaneously deposit parts of said mass of material to each of said tube members in substantially equal volume, the floating parts of said mass of material following the overflow of said washing fluid and the settling material passing down through the stationary tube members and accumulating in the bottom of said tank, means for directing a stream of washing fluid through the accumulative portion of said tank to carry away material therein and a conduit connected with said tank for conveying said fluid and material away therefrom.

5. The method of grading peas or separating mixed materials consisting in the steps of producing a vertical column of grading fluid from and above a flowing stream of fluid, the path of said stream including an incline to cause a back flow to produce the said vertical column, dividing said column into a plurality of fixed isolated separating zones each having an overflow, depositing a mass of mixed material into said plurality of separating zones where the heavy material will sink down through said column of fluid and the lighter material will follow the overflow from the plurality of isolated zones, adding additional fluid to said column of fluid at a point above the bottom thereof to raise the level of the overflow from said isolated zones and to cause a slight downward flow through the lower part of the column into the flowing stream to prevent the bottom of the column from choking up with accumulated material.

6. An apparatus for washing and cleaning vegetables and the like comprising a vertically disposed cylindrical tank, a series of vertically disposed tubular members arranged around the inside of said tank and in fixed relation thereto, said tubular members acting as means to isolate vertical columns of washing fluid, a primary conduit leading across the bottom of said tank, said conduit having an angular rise to an overflow of substantially the same height as the overflow of said tubular members, means for causing a flow of liquid through said conduit and up said incline, the resistance offered thereby causing liquid to rise in the said tank to the tops of said tubular members, secondary conduit means for receiving the overflow from said tubular members, means for distributing a mass of mixed material to said tubular members where the heavier particles will sink down through said body of liquid in said tank and be carried away by said flow of liquid through said primary conduit and the floating material be carried away by the overflow from said tubular members, an auxiliary fluid supply to said tank above the normal supply from said primary conduit for adding liquid to said tank to raise the level of the overflow from said tubular members and to cause a slight down flow to prevent the sinking material from choking the entrance to the flowing stream in said primary conduit.

EDWARD C. EBERTS.
EDWARD D. EBERTS.